(12) United States Patent
Kondo

(10) Patent No.: US 10,853,400 B2
(45) Date of Patent: Dec. 1, 2020

(54) DATA PROCESSING DEVICE, DATA PROCESSING METHOD, AND COMPUTER PROGRAM PRODUCT

(71) Applicants: Kabushiki Kaisha Toshiba, Minato-ku (JP); Toshiba Digital Solutions Corporation, Kawasaki (JP)

(72) Inventor: Masaki Kondo, Kawasaki (JP)

(73) Assignees: Kabushiki Kaisha Toshiba, Minato-ku (JP); Toshiba Digital Solutions Corporation, Kawasaki (JP)

( * ) Notice: Subject to any disclaimer, the term of this patent is extended or adjusted under 35 U.S.C. 154(b) by 270 days.

(21) Appl. No.: 16/126,557

(22) Filed: Sep. 10, 2018

(65) Prior Publication Data
US 2019/0251203 A1 Aug. 15, 2019

(30) Foreign Application Priority Data
Feb. 15, 2018 (JP) .................................. 2018-024700

(51) Int. Cl.
*G06F 7/00* (2006.01)
*G06F 16/35* (2019.01)
(Continued)

(52) U.S. Cl.
CPC .......... *G06F 16/35* (2019.01); *G06F 16/2237* (2019.01); *G06F 16/9017* (2019.01); *G06F 17/16* (2013.01)

(58) Field of Classification Search
CPC .. G06F 16/35; G06F 16/2237; G06F 16/9017; G06F 17/16; G06F 17/30247; G06F 17/30321; G06K 9/6223
See application file for complete search history.

(56) References Cited

U.S. PATENT DOCUMENTS

| 5,339,164 | A | * | 8/1994 | Lim | ..................... G06K 9/50 |
| | | | | | 348/390.1 |
| 5,477,221 | A | * | 12/1995 | Chang | ..................... G06T 9/008 |
| | | | | | 341/51 |

(Continued)

FOREIGN PATENT DOCUMENTS

| JP | 4-363000 A | 12/1992 |
| JP | 7-160287 A | 6/1995 |

(Continued)

OTHER PUBLICATIONS

Herve Jegou, et al., "Product quantization for nearest neighbor search", IEEE Trans. on PAMI, vol. 33, No. 1, 2011, 14 pages.

(Continued)

*Primary Examiner* — Mohammed R Uddin
(74) *Attorney, Agent, or Firm* — Oblon, McClelland, Maier & Neustadt, L.L.P.

(57) ABSTRACT

A data processing device according to an embodiment includes a sub-vector group generating unit, a codebook generating unit, and a converting unit. The sub-vector group generating unit generates, from a feature vector set of N number of D-dimensional feature vectors, M number of sub-vector groups (where M<D holds true). Each of the M number of sub-vector groups includes N number of dimension-variable sub-vectors obtained from the N number of D-dimensional feature vectors. For each of the M number of sub-vector groups, the codebook generating unit performs clustering of the N number of dimension-variable sub-vectors, and generates a codebook in which the representative vector of each cluster is associated with an index. The converting unit performs product quantization using the codebook and converts each of the N number of D-dimensional feature vectors into a compressed code made of a combination of M number of indexes.

8 Claims, 15 Drawing Sheets

(51) Int. Cl.
*G06F 17/16* (2006.01)
*G06F 16/22* (2019.01)
*G06F 16/901* (2019.01)

(56) References Cited

U.S. PATENT DOCUMENTS

| | | | |
|---|---|---|---|
| 5,487,128 A | | 1/1996 | Ozawa |
| 5,577,135 A * | | 11/1996 | Grajski .............. G06K 9/00422 |
| | | | 382/187 |
| 5,692,100 A * | | 11/1997 | Tsuboka ................ G10L 15/07 |
| | | | 704/222 |
| 5,890,110 A * | | 3/1999 | Gersho ................ G10L 19/02 |
| | | | 704/222 |
| 6,256,607 B1 * | | 7/2001 | Digalakis ............... G10L 15/02 |
| | | | 704/222 |
| 6,389,389 B1 * | | 5/2002 | Meunier ................ G10L 15/02 |
| | | | 704/222 |
| 7,454,341 B1 * | | 11/2008 | Pan ...................... G06K 9/6223 |
| | | | 704/231 |
| 8,676,729 B1 * | | 3/2014 | Keralapura ......... H04L 63/1416 |
| | | | 706/12 |
| 2001/0017941 A1 * | | 8/2001 | Chaddha ................ G06T 9/008 |
| | | | 382/236 |
| 2009/0304296 A1 * | | 12/2009 | Zhang .................. G06K 9/6267 |
| | | | 382/243 |
| 2016/0373293 A1 * | | 12/2016 | Kushmerick ........... H04L 67/38 |
| 2017/0083608 A1 * | | 3/2017 | Ye .......................... G06N 20/00 |
| 2018/0341805 A1 * | | 11/2018 | Jain ........................ G06F 17/00 |

FOREIGN PATENT DOCUMENTS

| | | |
|---|---|---|
| JP | 2641209 | 5/1997 |
| JP | 2013-148486 A | 8/2013 |
| JP | 2014-219557 A | 11/2014 |
| JP | 5637939 | 12/2014 |
| WO | WO 2015/008432 A1 | 1/2015 |

OTHER PUBLICATIONS

Dan Pelleg, et al., "X-means: Extending K-means with Efficient Estimation of the Number of Clusters", School of Computer Science, Carnegie Mellon University, 2000, 8 pages.

* cited by examiner

| ID: 1 | ID: 2 | ID: 3 | | |
| (0.04) | (0.23) | (1.02) | | |
| | | | | |
| ID: 1 | ID: 2 | ... | | ID: 4 |
| (0.12) | (0.03) | ... | | (0.85) |
| | | | | |
| ID: 1 | ID: 2 | | | |
| (0.15) | (0.09) | | | |

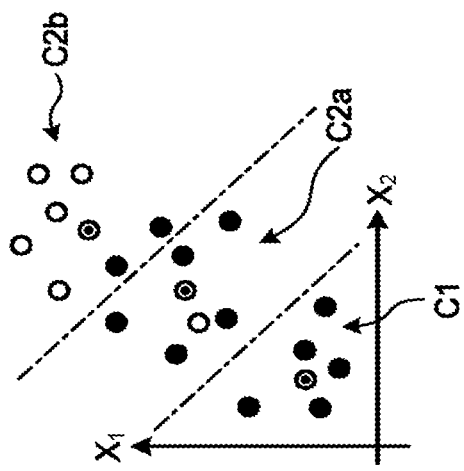
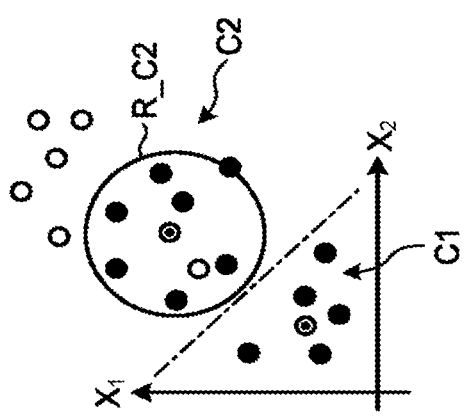
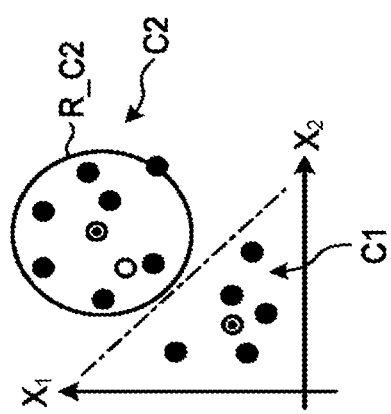
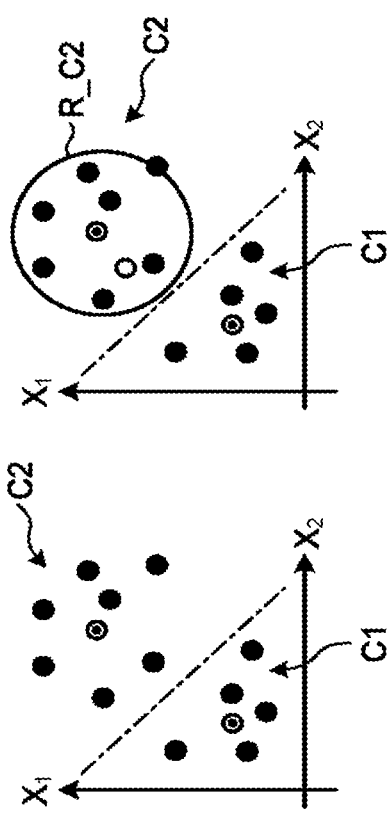

DATA PROCESSING DEVICE, DATA PROCESSING METHOD, AND COMPUTER PROGRAM PRODUCT

CROSS-REFERENCE TO RELATED APPLICATIONS

This application is based upon and claims the benefit of priority from Japanese Patent Application No. 2018-024700, filed on Feb. 15, 2018; the entire contents of which are incorporated herein by reference.

FIELD

Embodiments described herein relate generally to a data processing device, a data processing method, and a computer program product.

BACKGROUND

With the advent of the age of big data, for example, there has been an increase in the need to hold a large number of feature vectors used as case examples in pattern recognition. That has led to an increase in the cost of hardware such as memories or hard disk drives (HDDs) to be used in holding the feature vectors. As one of the solutions to this problem, a method is known for reducing the memory size of the feature vectors using product quantization. Herein, the product quantization represents a technology in which a feature vector is divided into a plurality of sub-vectors; a codebook is referred to; and each sub-vector is substituted with the index of the representative vector of the cluster, so that the feature vector gets converted into a compressed code. Moreover, a codebook represents a lookup table that is generated by clustering the to-be-held feature vector set on a subvector-by-subvector basis and associating the representative vector of each cluster with an index.

At the time of dividing a feature vector into a plurality of sub-vectors; conventionally, it is common practice to evenly divide the feature vector so that the individual sub-vectors have a same number of dimensions. However, in this method, it results in a large bias in the degree of dispersion among different sub-vectors and, at the time of generating a codebook, there are times when the number of clusters is either too large or too small depending on the sub-vectors. Moreover, if the product quantization of feature vectors is performed using the codebook generated in this manner, there is a concern of a decline in the quantization efficiency.

BRIEF DESCRIPTION OF THE DRAWINGS

FIG. 13 is a diagram illustrating an example of a difference lookup table;

FIGS. 14A, 14B, 14C, and 14D are diagrams for explaining a brief overview of the operations performed by a codebook updating unit.

DETAILED DESCRIPTION

A data processing device according to an embodiment includes a sub-vector group generating unit, a codebook generating unit, and a converting unit. The sub-vector group generating unit generates, from a feature vector set of N number of D-dimensional feature vectors, M number of sub-vector groups (where $M<D$ holds true). Each of the M number of sub-vector groups includes N number of dimension-variable sub-vectors obtained from the N number of D-dimensional feature vectors. Each of the N number of dimension-variable sub-vectors has, as the elements, the values of one or more dimensions extracted from the D-dimensional feature vectors. From among the M number of sub-vector groups, the number of elements in the dimension-variable sub-vectors in at least one sub-vector group is different from the number of elements of the dimension-variable sub-vectors in the other sub-vector groups. For each of the M number of sub-vector groups, the codebook generating unit performs clustering of the N number of dimension-variable sub-vectors, and generates a codebook in which the representative vector of each cluster is associated with an index. The converting unit performs product quantization using the codebook and converts each of the N number of D-dimensional feature vectors into a compressed code made of a combination of M number of indexes.

The embodiment of the data processing device, a data processing method, and a computer program product is described below in detail with reference to accompanying drawings. In the embodiment, the technology of converting feature vectors into compressed codes using product quantization is a technology under consideration, and particularly the method of generating sub-vectors and the method of clustering sub-vector groups are improved so as to enable efficient quantization of feature vectors.

Brief Overview of Product Quantization

Firstly, prior to giving specific explanation of the embodiment, the explanation is given about a brief overview of product quantization based on a conventional and commonly-used method. The technology for converting feature vectors into compressed codes using product quantization include a phase of generating a codebook from the feature vector set to be held; and includes a phase of converting the feature vectors included in the feature vector set into compressed codes using the codebook. In the following explanation, N represents the number of feature vectors included in the feature vector set to be held, D represents the number of dimensions of each feature vector, and M represents the number of divisions for which each feature vector is divided into sub-vectors (i.e., M represents the number of sub-vectors generated from each feature vector).

Figure 1:
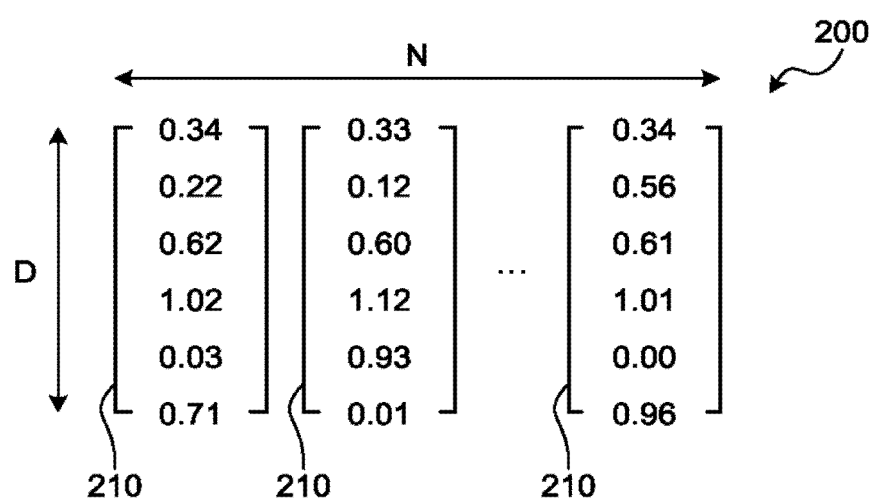
FIG. 1 is a diagram illustrating an example of a feature vector set.

Then, the explanation is given about the phase of generating a codebook from a feature vector set. In FIG. 1 illustrates an example of the feature vector set. As illustrated in FIG. 1, a feature vector set 200 includes N number of D-dimensional feature vectors (hereinafter, simply referred to as "feature vectors") 210. In the example illustrated in FIG. 1, in order to give an easy-to-understand explanation of the brief overview of product quantization, it is assumed that the number D of dimensions of the feature vectors 210 is equal to six. However, in reality, it is common to have a higher number D of dimensions of the feature vectors 210.

Figure 2:
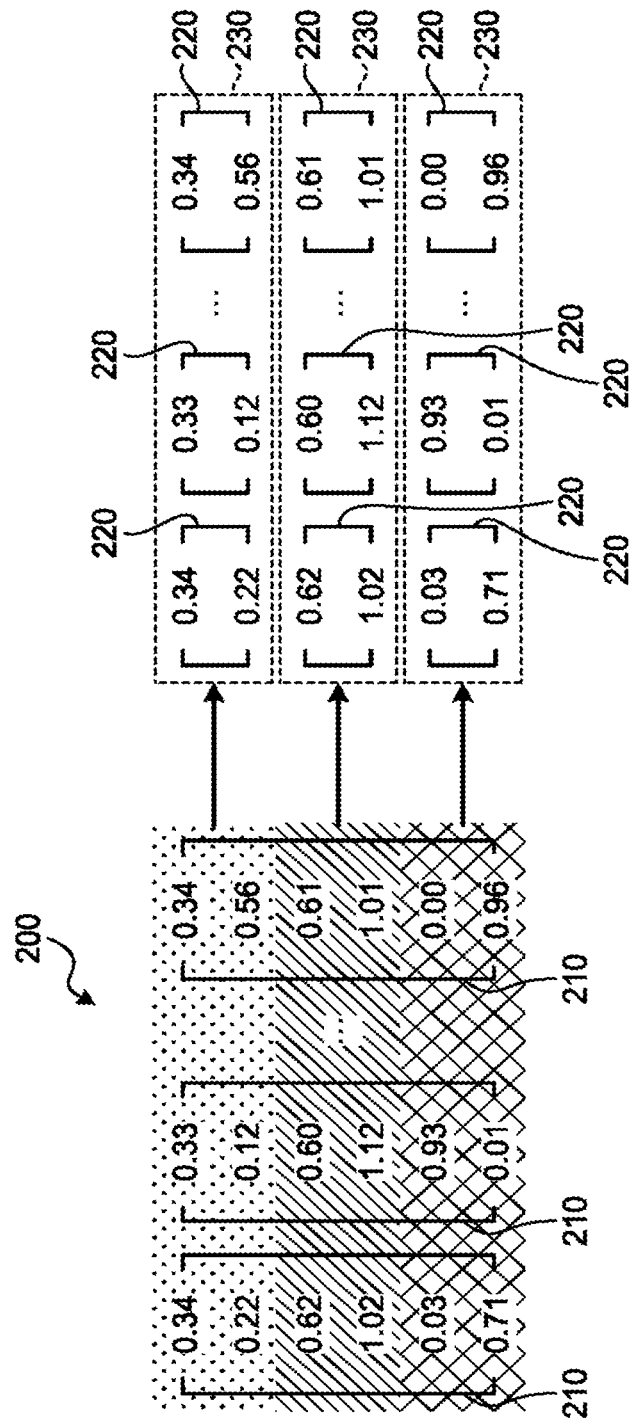
FIG. 2 is a diagram for explaining a conventional method for generating sub-vector groups from the feature vector set.

At the time of generating a codebook from the feature vector set 200; firstly, for example, as illustrated in FIG. 2, each feature vector 210 included in the feature vector set 200 is divided into M number of sub-vectors 220 so that M number of sub-vector groups are generated. In the example illustrated in FIG. 2, the division number M (i.e., the number of sub-vector groups 230) of the feature vectors 210 is set to be equal to three.

Regarding the division of each feature vector 210 into M number of sub-vectors 220, according to the conventional and commonly-used method, equal division is implemented so that the sub-vectors 220 have the same number of dimensions. In the example illustrated in FIG. 2, in order to have three divisions (M=3) of each six-dimensional (D=6) feature vector 210, each sub-vector 220 has a number of dimensions equal to two. Each of the M number of sub-vector groups 230 includes N number of sub-vectors 220 obtained from the N number of feature vectors 210 included in the feature vector set 200, and the N number of sub-vectors 220 included in a single sub-vector group 230 has the common dimensions extracted from the N number of feature vectors 210 as elements. For example, a single sub-vector group 230 is made of the following sub-vectors: the sub-vector 220 having the first dimension and the second dimension of the first feature vector 210; the sub-vector 220 having the first dimension and the second dimension of the second feature vector 210, and the sub-vector 220 having the first dimension and the second dimension of the N-th feature vector 210 as elements. Herein, M number of such sub-vector groups 230 are generated that are equal in number to the division number of the feature vector 210.

Subsequently, K-means clustering is performed with respect to each of the M number of sub-vector groups 230, and the N number of sub-vectors 220 included in each sub-vector group 230 are clustered into K number of clusters. Then, for each sub-vector group 230, a codebook is generated in which the representative vectors of the K number of clusters are associated with indexes. Herein, the value of K is sufficiently smaller than the number N of the feature vectors 210 included in the feature vector set 200. Moreover, it is assumed that the indexes in the codebook are expressed as 8-bit indexes, and the value K is assumed to be equal to $2^8$=256.

Figure 3:
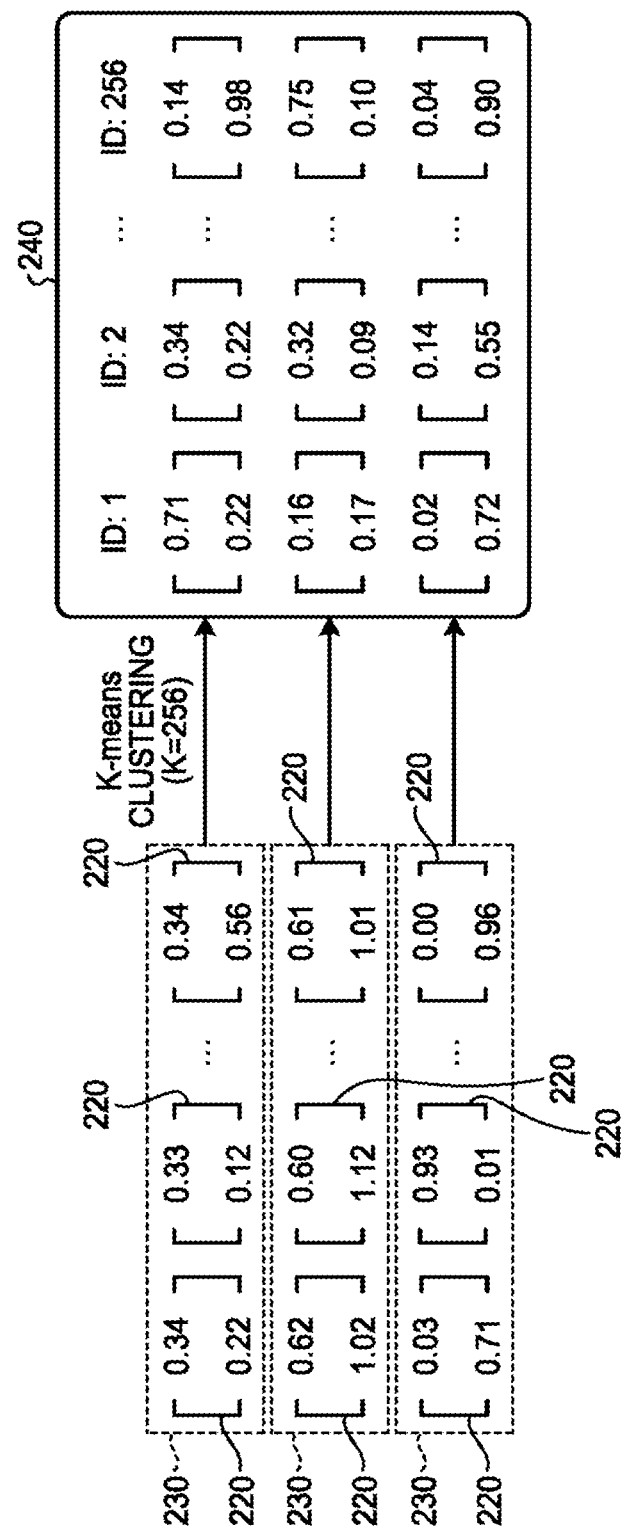
FIG. 3 is a diagram for explaining a conventional method for generating a codebook.

As illustrated in the example in FIG. 2, according to the division number M=3 of the feature vector 210, when three sub-vector groups 230 are generated from the feature vector set 200; as illustrated in FIG. 3, K-means clustering (K=256) is performed with respect each of the three sub-vector groups 230 so that each of the three sub-vector groups 230 gets clustered into 256 clusters. Then, the representative vector of each cluster is associated with an index (ID: 1 to 256) representing the value indicating the representative vector of that cluster, and thus a codebook 240 is generated. Meanwhile, the representative vector of a cluster is, for example, a centroid of that cluster.

Figure 4:
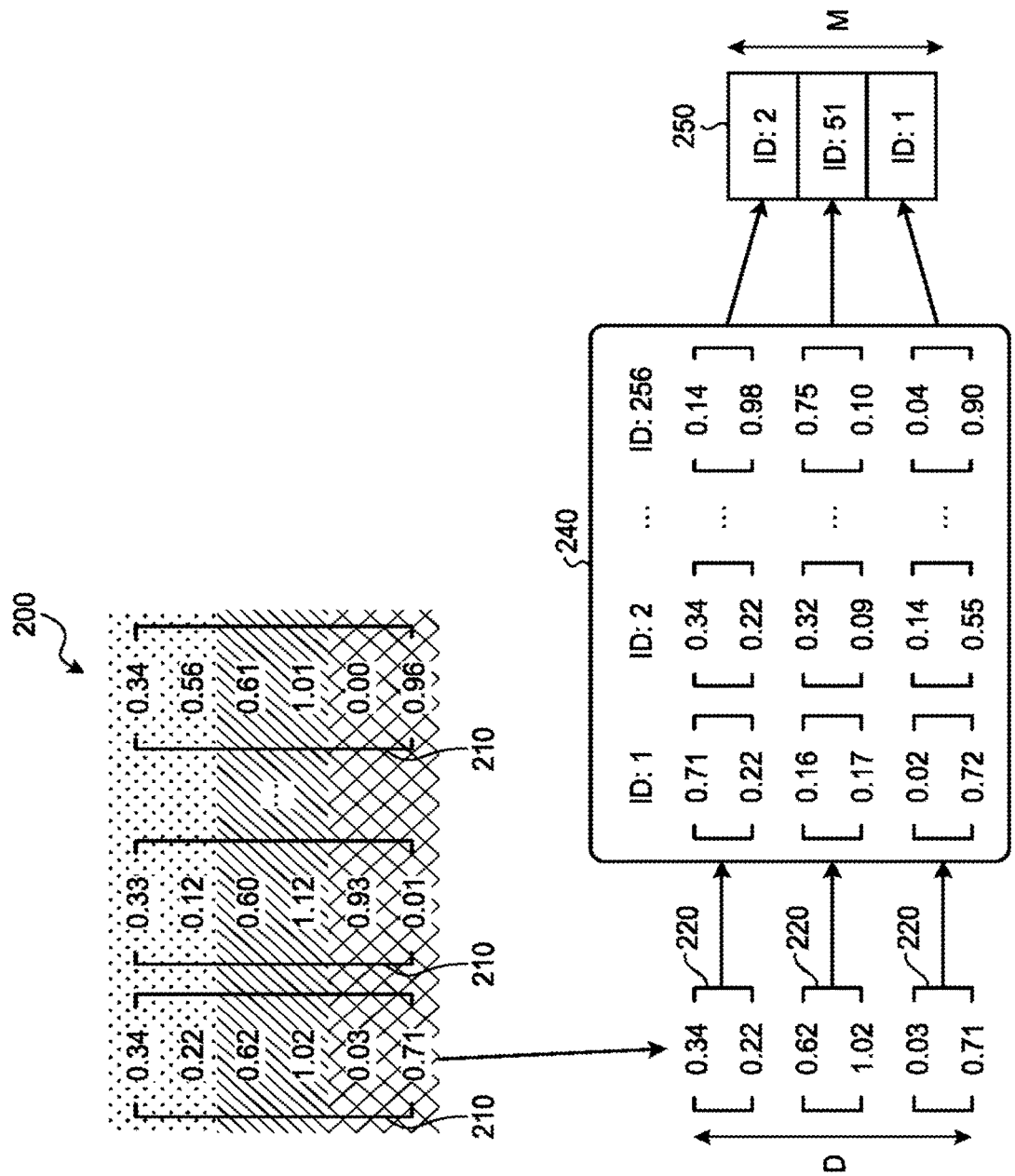
FIG. 4 is a diagram for explaining a method for converting a feature vector into a compressed code using a codebook.

Given below is the explanation of the phase of converting each feature vector 210, which is included in the feature vector set 200, into a compressed code using the codebook 240. At the time of converting each feature vector 210, which is included in the feature vector set 200, into a compressed code; firstly, as illustrated in FIG. 4, a single feature vector 210 is retrieved from the feature vector set 200 and is divided into M number of sub-vectors 220 (in the example illustrated in FIG. 4, three sub-vectors 220) according to the same method as the method implemented at the time of generating the codebook 240. Then, regarding each of the M number of sub-vectors 220, the codebook 240 that is generated in the manner described above is referred to for identifying the closest representative vector to the concerned sub-vector 220, and the index corresponding to that representative vector is obtained. Then, the M number of obtained indexes are placed according to the order of the sub-vectors 220 in the feature vector 210, and a compressed code 250 is generated. In this way, the D-dimensional feature vector 210 gets converted into the compressed code 250 having the length M.

Figure 5:
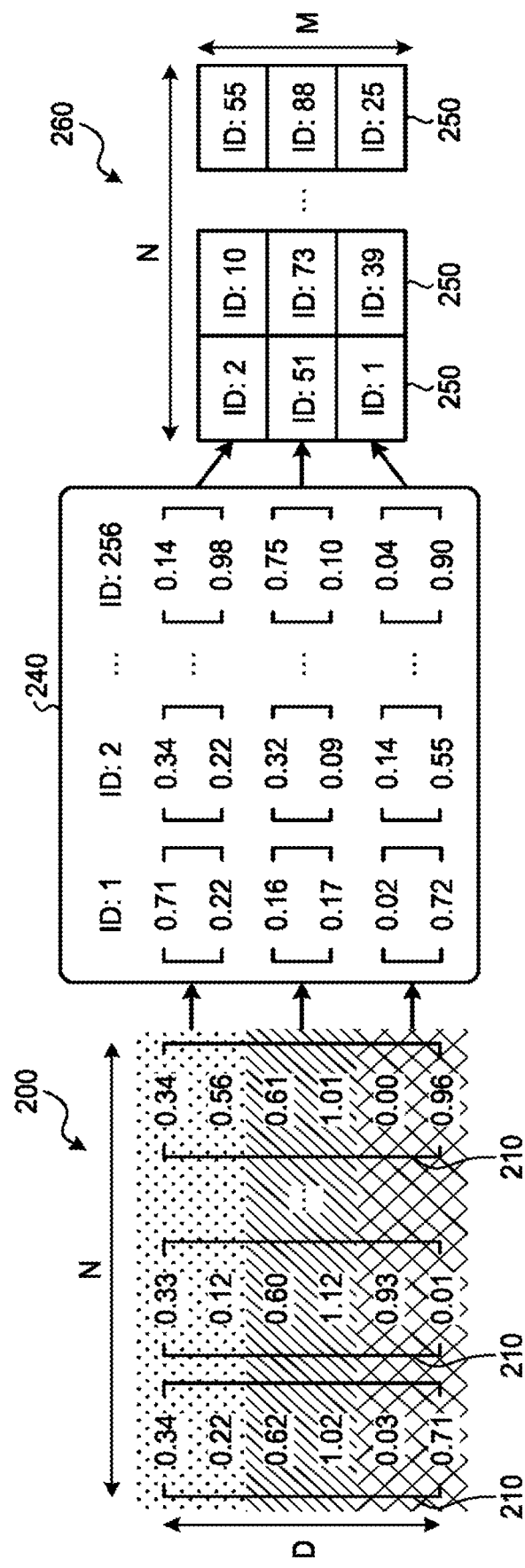
FIG. 5 is a diagram for explaining a method for converting feature vectors into compressed codes using the codebook.

The operations described above are performed with respect to all of the N number of feature vectors 210 included in the feature vector set 200. As a result, as illustrated in FIG. 5, the feature vector set 200 gets converted into a compressed code set 260 that includes N number of compressed codes 250. As a result of converting the feature vector set 200 into the compressed code set 260 and then storing the compressed code set 260, it becomes possible to reduce the memory size. Regarding the data obtained as a result of converting the feature vector set 200 into the compressed code set 260, the compression ratio of the data becomes higher in inverse proportion to the division number M of the feature vectors 210 and in inverse proportion to the value of the cluster number K in K-means clustering performed with respect to the sub-vector groups 230. On the other hand, the representational power of the feature vectors 210 that is attributed to the compressed code 250 increases in proportion to the division number M of the feature vectors 210 and in proportion to the value of the cluster number K in K-means clustering performed with respect to the sub-vector groups 230. For that reason, the division number M of the feature vectors 210 and the value of the cluster number K in K-means clustering are decided in such a way that the compression rate can be increased as much as possible while maintaining the representational power demanded in the application, that is, in such a way that an excellent quantization efficiency is achieved.

BRIEF OVERVIEW OF EMBODIMENT

In the conventional and commonly-used method for product quantization as described above, the division number M of the feature vectors (i.e., the number of dimensions of the sub-vectors 220) and the cluster number K in K-means clustering are fixed. Hence, at the time of generating the codebook 240, there are times when too many clusters or too few clusters are generated depending on the sub-vector groups 230. If product quantization of the feature vectors 210 is performed using the codebook 240 generated in the abovementioned manner, then there is a concern of a decline in the quantization efficiency.

In that regard, in the embodiment, during product quantization, without deciding the pattern of quantization level in advance, the most suitable quantization level (cluster number) is automatically decided for each sub-vector group 230, and the quantization efficiency is improved. More particularly, using the X-means clustering method, the quantization level for each sub-vector group 230 is automatically decided. Herein, X-means clustering is a clustering method formed by improving K-means clustering, and enables automatic decision on the most suitable cluster number.

(Reference Literature) Dan Pelleg, Andrew Moore, "X-means: Extending K-means with Efficient Estimation of the Number of Clusters" School of Computer Science, Carnegie Mellon University, Pittsburgh, Pa. 15213 USA.

However, in X-means clustering, if there is a large dispersion in the sub-vectors 220 in the target sub-vector group 230 for clustering, then the number of automatically-decided clusters increases and thus the period of time required for clustering becomes enormously large. The dispersion of the sub-vectors 220 in the sub-vector groups 230 increases in proportion to the number of dimensions of the sub-vectors 220. In order to solve this problem, in the present embodiment, the method for generating the sub-vectors 220 is improved.

Conventionally, as described earlier, each feature vector 210 is evenly divided so as to have a same number of dimensions for all sub-vectors 220. In that case, there occurs variability in the degree of dispersion of the sub-vectors 220 among the sub-vector groups 230. Hence, there is a possibility of having the sub-vector groups 230 with or without extremely large dispersion of the sub-vectors 220.

In order to prevent such a situation, in the present embodiment, the dimensions of the sub-vectors 220 are set to be variable (in the following explanation, such sub-vectors 220 are written as "dimension-variable sub-vectors 220"). Moreover, in order to ensure that the dimension-variable sub-vectors 220 in each sub-vector group 230 have about equal dispersion, M number of sub-vector groups 230 are generated by selecting the dimensions of the feature vectors 210 included in the feature vector set 200. Then, the codebook 240 is generated using the M number of sub-vector groups 230, and the feature vectors 210 are converted into the compressed codes 250 according to product quantization.

Given below is the explanation of specific examples in which the concept of the embodiment described above is implemented. In the following explanation, the constituent elements having identical functions are referred to by the same reference numerals, and their explanation is not repeated.

First Example

Figure 6:
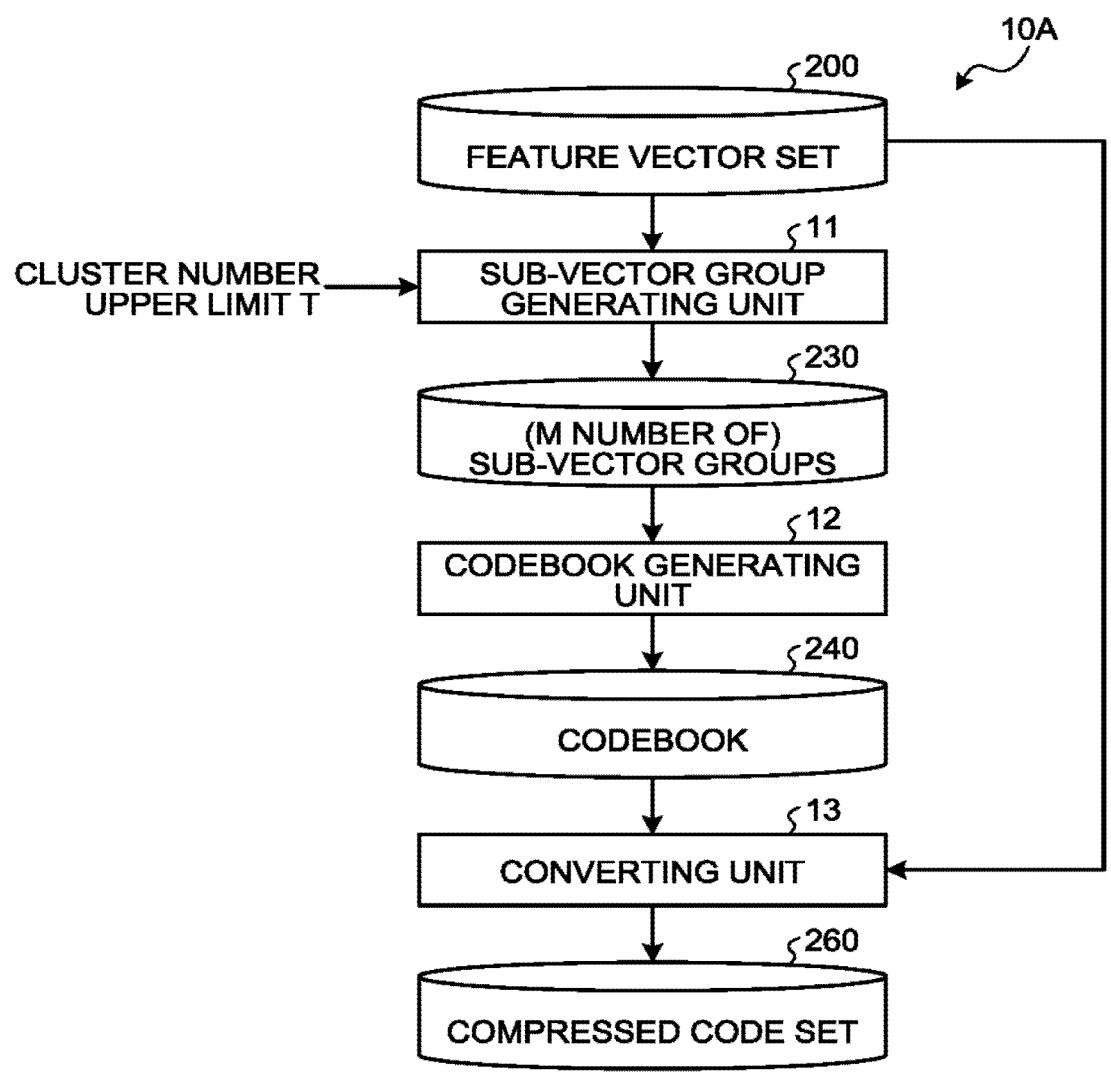
FIG. 6 is a block diagram illustrating an exemplary functional configuration of a data processing device according to a first example.

FIG. 6 is a block diagram illustrating an exemplary functional configuration of a data processing device 10A according to a first example. As illustrated in FIG. 6, the data processing device 10A according to the first example includes a sub-vector group generating unit 11, a codebook generating unit 12, and a converting unit 13.

The sub-vector group generating unit 11 generates M number of sub-vector groups 230 from the feature vector set 200 including N number of feature vectors 210. Each of the M number of sub-vector groups 230 includes N number of dimension-variable sub-vectors 220 obtained from the N number of feature vectors 210. Each of the N number of dimension-variable sub-vectors 220 has, as the elements, the values of one or more dimensions extracted from the feature vectors 210. The number M of the sub-vector groups 230 generated by the sub-vector group generating unit 11 is smaller than the dimension number D of the feature vectors. However, in contrast to the conventional fixed value, the number M is a variable value decided in an adaptive manner.

Figure 7:
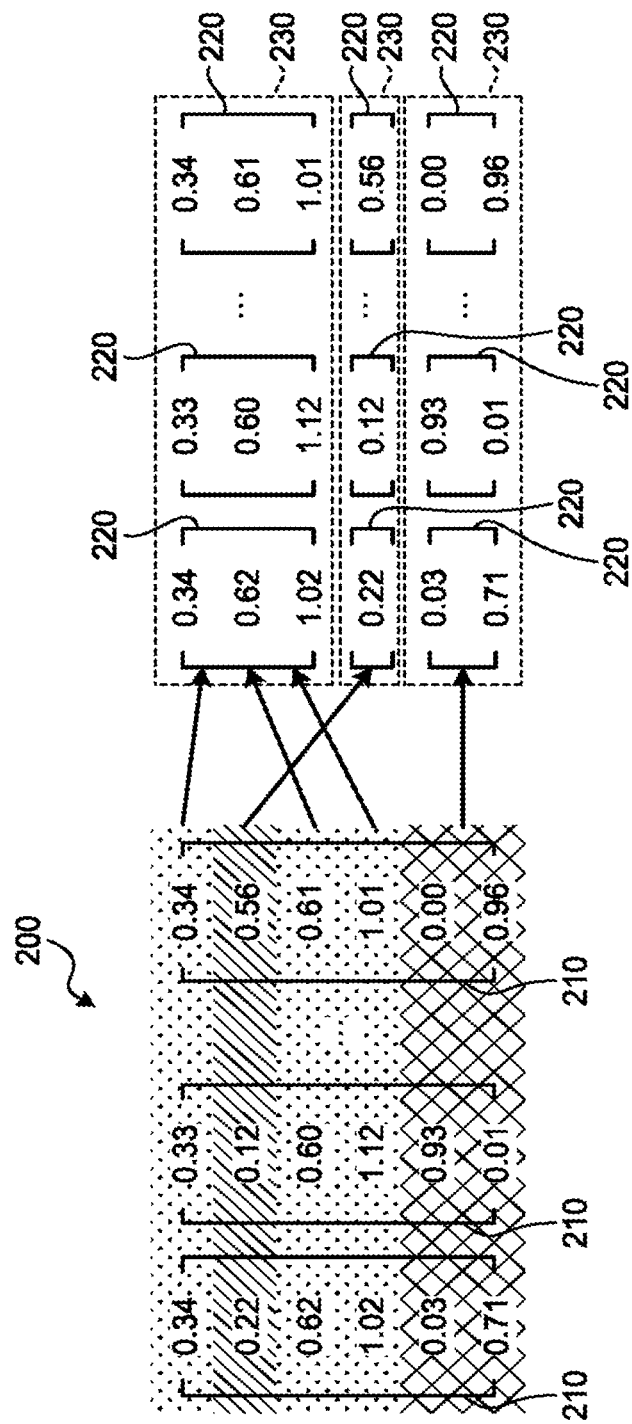
FIG. 7 is a diagram illustrating a condition in which sub-vector groups are generated from the feature vector set.

FIG. 7 is a diagram illustrating a condition in which the sub-vector group generating unit 11 generates the M number of sub-vector groups 230 from the feature vector set 200, and illustrating a condition in which three sub-vector groups 230 are generated from the feature vector set 200 illustrated in FIG. 1. Herein, unlike the conventional case in which each feature vector 210 included in the feature vector set 200 is equally divided, the sub-vector group generating unit 11 selects the dimensions of each feature vector 210 included in the feature vector set 200 and generates the M number of sub-vector groups 230 (in the example illustrated in FIG. 7, M=3) as illustrated in FIG. 7. At that time, the sub-vector group generating unit 11 selects the dimensions in such a way that the degree of dispersion of the dimension-variable sub-vectors 220 is similar among the M number of sub-vector groups 230, and generates the M number of sub-vector groups 230 from the feature vector set 200. Hence, among the different sub-vector groups 230, the number of dimensions (the number of elements) of the dimension-variable sub-vectors 220 is not identical. That is, from among the M number of sub-vector groups 230 generated by the sub-vector group generating unit 11, the number of elements of the dimension-variable sub-vectors 220 in at least a single sub-vector group 230 is different than the number of elements of the dimension-variable sub-vectors 220 in the other sub-vector groups 230.

Figure 8:
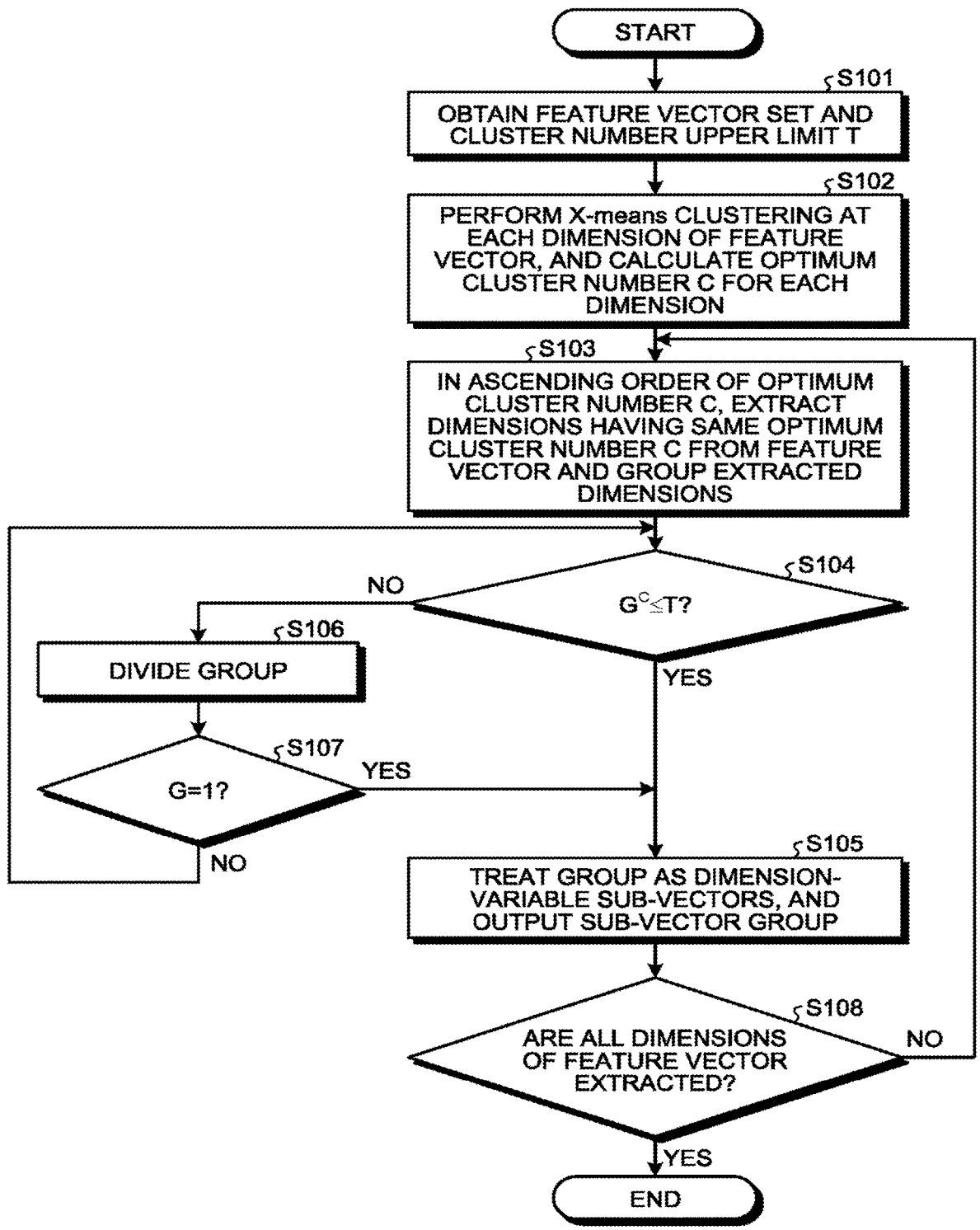
FIG. 8 is a flowchart for explaining a specific example of the operations performed by a sub-vector group generating unit.

FIG. 8 is a flowchart for explaining a specific example of the operations performed by the sub-vector group generating unit 11. For example, as a result of performing operations illustrated in the flowchart in FIG. 8, the sub-vector group generating unit 11 can generate M number of sub-vector groups 230 having approximately equal degree of dispersion of the dimension-variable sub-vectors 220.

The sub-vector group generating unit 11 firstly obtains the feature vector set 200 and a cluster number upper limit T (Step S101). The cluster number upper limit T represents a hyper-parameter set by the user.

Then, regarding the N number of feature vectors 210 included in the feature vector set 200, the sub-vector group generating unit 11 performs X-means clustering at each dimension and calculates an optimum cluster number C for each dimension (Step S102).

Subsequently, the sub-vector group generating unit 11 extracts, in ascending order of the optimum cluster number C, the dimensions having the same optimum cluster number C from the feature vector 210 and groups those dimensions (Step S103). Then, the sub-vector group generating unit 11 calculates an optimum cluster number $G^C$ of the sub-vector group 230 from the number G of dimensions belonging to the group and the optimum cluster number C of the dimensions belonging to the group, and determines whether or not the optimum cluster number $G^C$ is equal to or smaller than the cluster number upper limit T (Step S104).

If the optimum cluster number $G^C$ is equal to or smaller than the cluster number upper limit T (Yes at Step S104), then the sub-vector group generating unit 11 treats that group (the combination of dimensions extracted from the feature vectors 210) as the dimension-variable sub-vectors 220, and outputs the sub-vector group 230 that includes the N number of dimension-variable sub-vectors 220 corresponding to the N number of feature vectors 210 included in the feature vector set 200 (Step S105).

On the other hand, if the optimum cluster number $G^C$ is greater than the cluster number upper limit T (No at Step S104), then the sub-vector group generating unit 11 divides that group (Step S106) and determines whether or not the number G of dimensions belonging to the divided group has become equal to one (Step S107). If the number G of dimensions belonging to the divided group is not equal to one (No at Step S107), then the system control returns to Step S104 and the subsequent operations are repeated. That is, regarding the group in which the optimum cluster number $G^C$ of the sub-vector groups 230 is greater than the cluster number upper limit T, the sub-vector group generating unit 11 divides the group until the optimum cluster number $G^C$ becomes equal to or smaller than the cluster number upper limit T or until the number G of dimensions belonging to the group becomes equal to one. Subsequently, when the optimum cluster number $G^C$ becomes equal to or smaller than the cluster number upper limit T (Yes at Step S104) or when the number G of dimensions belonging to the group becomes equal to one (Yes at Step S107), the system control returns to Step S105 and the sub-vector group generating unit 11 outputs the sub-vector groups 230.

Then, the sub-vector group generating unit 11 determines whether or not all dimensions are extracted from the feature vectors 210 (Step S108). If any dimension is not yet extracted from the feature vectors (No at Step S108), then the system control returns to Step S103 and the subsequent operations are repeated. When all dimensions are extracted from the feature vectors 210 and when the operation at Step S105 is completed, it marks the end of the sequence of operations illustrated in the flowchart in FIG. 8.

For each of the M number of sub-vector groups 230 generated by the sub-vector group generating unit 11, the codebook generating unit 12 performs clustering of the N number of dimension-variable sub-vectors 220 and generates the codebook 240 in which the representative vector of each cluster is associated with an index.

For example, for each of the M number of sub-vector groups 230, the codebook generating unit 12 performs K-means clustering in which K represents the optimum cluster number $G^C$ estimated at the time of generating the sub-vector groups 230; and generates the codebook 240. Alternatively, for each of the M number of sub-vector groups 230, the codebook generating unit 12 can perform X-means clustering; and can generate the codebook 240.

Figure 9:
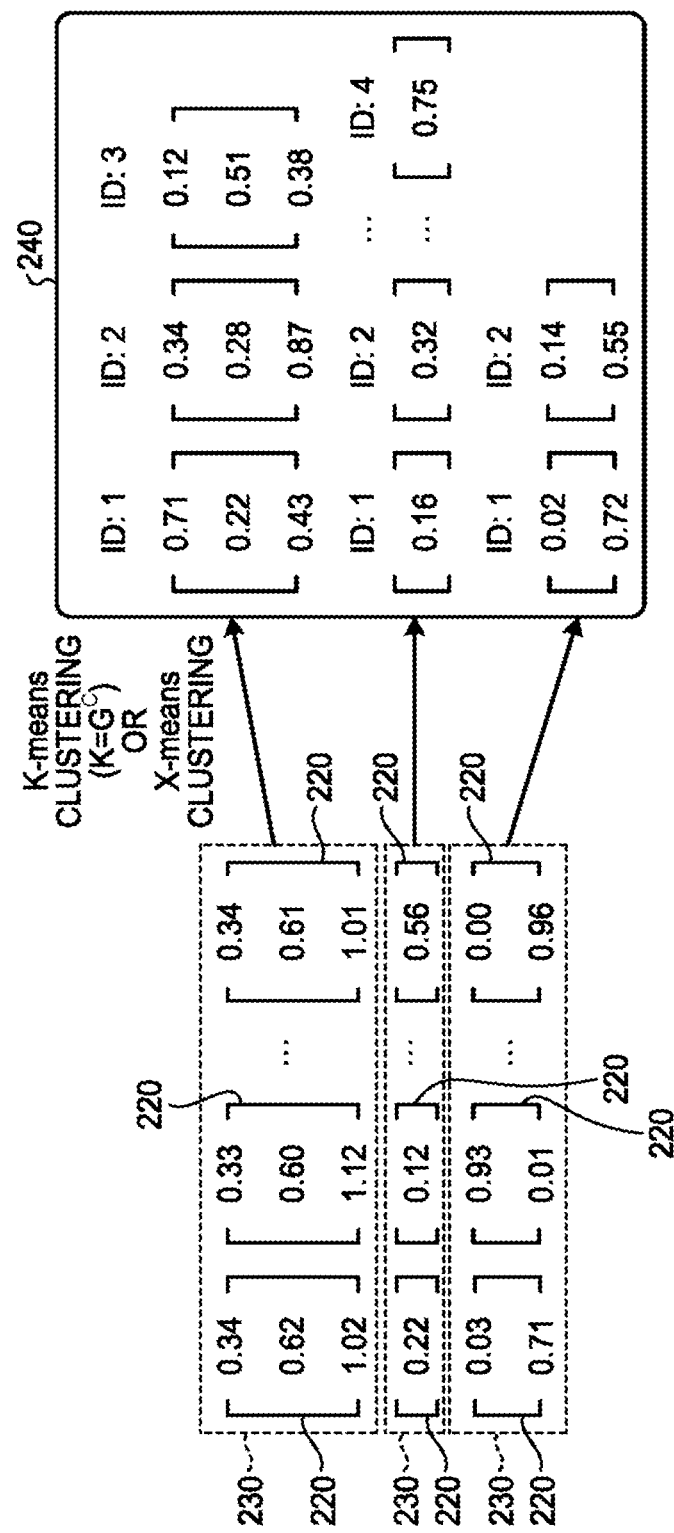
FIG. 9 is a diagram illustrating a condition in which the codebook is generated.

FIG. 9 is a diagram illustrating a condition in which the codebook generating unit 12 generates the codebook 240, and illustrating a condition in which the codebook 240 is generated from the three sub-vector groups 230 illustrated in FIG. 7. As described earlier, for each sub-vector group 230, the codebook generating unit 12 performs clustering of the dimension-variable sub-vectors 220 based on the optimum cluster number of the concerned sub-vector group 230. Hence, as illustrated in FIG. 9, in the codebook 240 generated by the codebook generating unit 12, the cluster number corresponding to each sub-vector group 230 is not identical. That is, the codebook 240 is generated in such a way that, from among the M number of sub-vector groups 230, the cluster number corresponding to at least a single sub-vector group 230 is different than the cluster number corresponding to the other sub-vector groups 230.

The converting unit 13 performs product quantization using the codebook 240 generated by the codebook generating unit 12; converts each of the N number of feature vectors 210 included in the feature vector set 200 into the compressed code 250; and outputs the compressed code set 260 that includes N number of compressed codes 250. As a result of performing product quantization using the codebook 240 generated by the codebook generating unit 12, the N number of feature vectors 210 included in the feature vector set 200 can be quantized in an efficient manner. Meanwhile, the method by which the converting unit 13 converts the feature vectors 210 into the compressed codes 250 is identical to the conventional and commonly-used method, except for the fact that the codebook 240 is different than the codebook used in the conventional and commonly-used method. Hence, the detailed explanation of the method is not given.

In the data processing device 10A configured in the manner described above, the codebook 240 can be generated within a practically-usable calculation period; and the codebook 240 is then used in performing product quantization of the feature vectors, so that it becomes possible to improve the quantization efficiency of the feature vectors 210. Moreover, as a result of achieving improvement in the quantization efficiency of the feature vectors 210, a large number of feature vectors 210 can be held using only a small amount of memory.

Second Example

Given below is the explanation of a second example. In the second example, a function of adjusting the cluster value upper limit T, which represents the parameter for deciding the quantization level, is added to the first example. The other functions are identical to those of the first example. Hence, the following explanation is given only for the function peculiar to the second example.

By taking into acnumber the actual operations, it becomes necessary to have a target, such as the tolerance toward the degree of variability in the search accuracy before and after the conversion of the feature vector set 200 into the compressed code set 260 or the degree of increasing the compression rate attributed to the conversion of the feature vector set 200 into the compressed code set 260. For that reason, the target value with respect to the degree of variability of the search accuracy or with respect to the compression rate needs to be set as a hyper-parameter.

Regarding the search accuracy, when X represents the number of times of searching the feature vectors 210 using a query and when Y represents the number of times for which the search result was the correct answer, the search accuracy is expressed as Y/X. Moreover, regarding the degree of variability of the search accuracy, when Zb represents the search accuracy before the conversion of the feature vector set 200 into the compressed code set 260 and when Za represents the search accuracy after the conversion of the feature vector set 200 into the compressed code set 260, the degree of variability is expressed as 1−Za/Zb. Furthermore, regarding the compression rate, when x represents the data size of the feature vector set 200 and when y represents the combined data size of the compressed code set 260 and the codebook 240, the compression rate is expressed as y/x.

The degree of variability of the search accuracy and the compression rate change according to the quantization level of product quantization. In the second example, the cluster number upper limit T representing the parameter for deciding the quantization level is adjusted with the aim of bringing the degree of variability of the search accuracy or the compression rate closer to the target value set as the hyper-parameter. However, if all cluster number upper limits are searched, then the amount of calculation becomes enormous. Hence, the search is made more efficiently according to a method described later.

Figure 10:
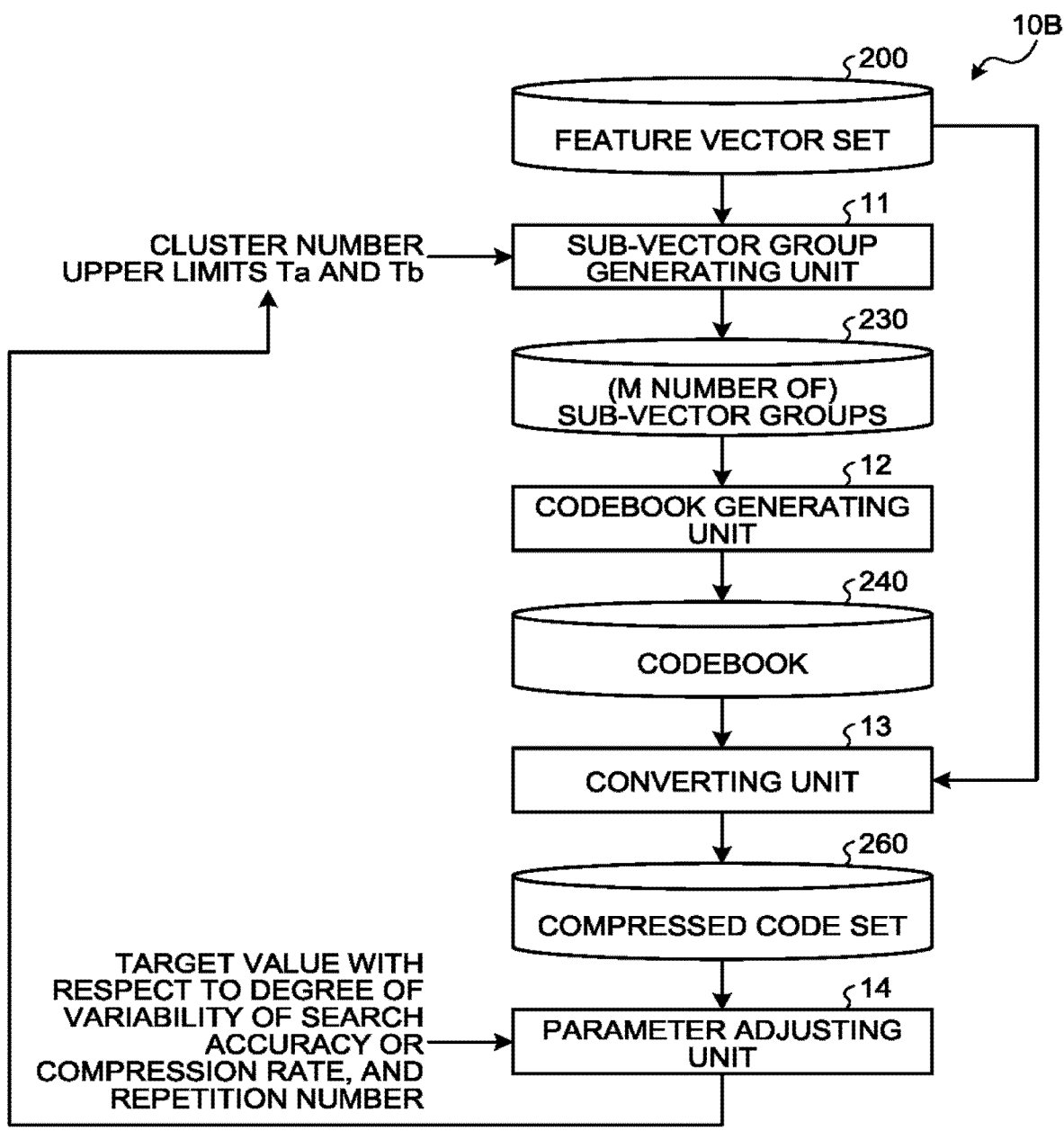
FIG. 10 is a block diagram illustrating an exemplary functional configuration of a data processing device according to a second example.

FIG. 10 is a block diagram illustrating an exemplary functional configuration of a data processing device 10B according to the second example. As illustrated in FIG. 10, the data processing device 10B according to the second example includes a parameter adjusting unit 14 in addition to the configuration of the data processing device 10A (see FIG. 6) according to the first example. Moreover, in the second example, two cluster number upper limits Ta and Tb are set as hyper-parameters, and the target value with respect to the degree of variability of the search accuracy or the compression rate is set along with the search repetition number.

The parameter adjusting unit 14 repeatedly performs, for the number of times equal to the repetition number set as a hyper-parameter, an operation of varying either one of the two cluster number upper limits Ta and Tb according to a method described later, so as to ensure that the degree of variability of the search accuracy or the compression rate gets closer to the target value set as a hyper-parameter; and exploratorily decides on the cluster number upper limit T.

Figure 11:
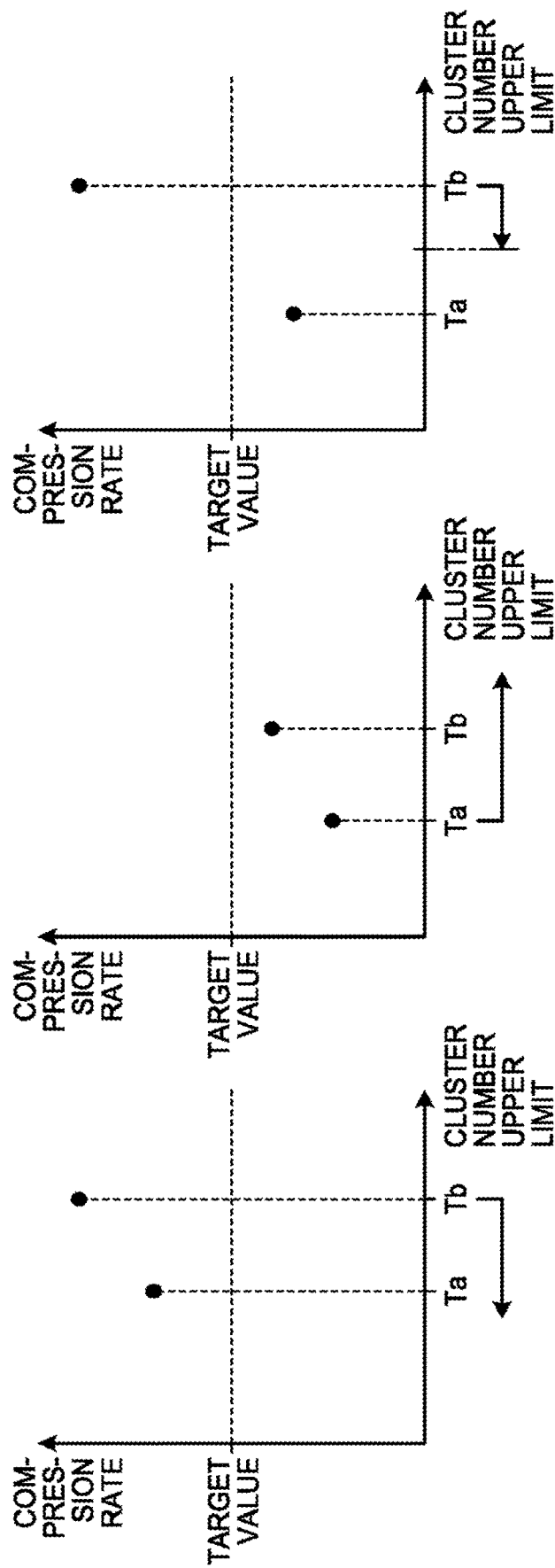
FIGS. 11A, 11B, and 11C are diagrams for explaining a search method of searching for a cluster number upper limit.

In the data processing device 10B according to the second example, using each of the two cluster number upper limits Ta and Tb that are set as hyper-parameters, the feature vector set 200 is separately compressed according to product quantization identical to that of the first embodiment. Then, the degree of variability of the search accuracy or the compression rate is calculated for each of the cluster number upper limits Ta and Tb. The calculation result at that time can be classified into three patterns illustrated in FIGS. 11A, 11B, and 11C. According to the three patterns, the parameter adjusting unit 14 varies either one of the cluster number upper limits Ta and Tb in the manner described below, and searches for the optimum cluster number upper limit T. FIGS. 11A, 11B, and 11C are diagrams for explaining a search method of searching for the cluster number upper limit T, and are diagrams illustrating an example of searching for the optimum cluster number upper limit T meant for bringing the compression rate closer to the target value.

In FIG. 11A is illustrated a case in which the compression rate in the case of using the cluster number upper limit Ta and the compression rate in the case of using the cluster number upper limit Tb are higher than the target value. In this case, it is desirable that the cluster number upper limits T are adjusted so as to lower the compression rate. Then, the parameter adjusting unit 14 keeps that cluster number upper limit T fixed for which the compression rate is closer to the target value (in the example illustrated in FIG. 11A, the cluster number upper limit Ta), and varies the other cluster number upper limit T (in the example illustrated in FIG. 11A, the cluster number upper limit Tb). At that time, as illustrated in FIG. 11A, if the compression rate in the case of using the fixed cluster number upper limit T and the compression rate in the case of using the variable cluster number upper limit T have a positive slope therebetween, then the variable cluster number upper limit T is varied to be smaller than the fixed cluster number upper limit T. On the other hand, if the concerned slope is negative, then the variable cluster number upper limit T is varied to be greater than the fixed cluster number upper limit T.

In FIG. 11B is illustrated a case in which the compression rate in the case of using the cluster number upper limit Ta and the compression rate in the case of using the cluster number upper limit Tb are smaller than the target value. In this case, it is desirable that the cluster number upper limits T are adjusted so as to increase the compression rate. In that regard, the parameter adjusting unit 14 keeps that cluster number upper limit T fixed for which the compression rate is closer to the target value (in the example illustrated in FIG. 11B, the cluster number upper limit Tb), and varies the other cluster number upper limit T (in the example illustrated in FIG. 11B, the cluster number upper limit Ta) in such a way that the direction of increase and decrease is opposite to the example illustrated in FIG. 11A. That is, as illustrated in FIG. 11B, if the compression rate in the case of using the fixed cluster number upper limit T and the compression rate in the case of using the variable cluster number upper limit T have a positive slope therebetween, then the variable cluster number upper limit T is varied to be greater than the fixed cluster number upper limit T. On the other hand, if the concerned slope is negative, then the variable cluster number upper limit T is varied to be smaller than the fixed cluster number upper limit T.

In FIG. 11C is illustrated a case in which either the compression rate in the case of using the cluster number upper limit Ta or the compression rate in the case of using the cluster number upper limit Tb is greater than the target value, and the other cluster number upper limit is smaller than the target value. In this case, it is highly likely that the optimum cluster number upper limit T is present in between the two cluster number upper limits Ta and Tb. In that regard, the parameter adjusting unit 14 keeps that cluster number upper limit T fixed for which the compression rate is closer to the target value (in the example illustrated in FIG. 11C, the cluster number upper limit Ta), and varies the other cluster number upper limit T (in the example illustrated in FIG. 11C, the cluster number upper limit Tb) to an intermediate value of the two cluster number upper limits Ta and Tb.

Meanwhile, even when the degree of variability of the search accuracy is set as the target value, the operations corresponding to the three patterns illustrated in FIGS. 11A, 11B, and 11C are identical. That is, when the degree of variability of the search accuracy in the case of using the cluster number upper limit Ta and the degree of variability of the search accuracy in the case of using the cluster number upper limit Tb are greater than the target value, one of the cluster number upper limits Ta and Tb can be varied in an identical manner to the example illustrated in FIG. 11A. When the degree of variability of the search accuracy in the case of using the cluster number upper limit Ta and the degree of variability of the search accuracy in the case of using the cluster number upper limit Tb are smaller than the target value, one of the cluster number upper limits Ta and Tb can be varied in an identical manner to the example illustrated in FIG. 11B. When either the degree of variability of the search accuracy in the case of using the cluster number upper limit Ta or the degree of variability of the search accuracy in the case of using the cluster number upper limit Tb is greater than the target value and when the other cluster number upper limit is smaller than the target value, one of the cluster number upper limits Ta and Tb can be varied in an identical manner to the example illustrated in FIG. 11C.

In the data processing device 10B according to the second example, every time the parameter adjusting unit 14 varies one of the cluster number upper limits Ta and Tb, the varied cluster number upper limit T is used for compressing the feature vector set 200 according to product quantization identical to the first embodiment, and the degree of variability of the search accuracy or the compression rate is calculated. That operation is repeatedly performed until reaching the repetition number set as a hyper-parameter. As a result, the optimum cluster number upper limit T can be narrowed down in an efficient manner.

As described above, in the second example, the cluster number upper limit T is exploratarily decided in such a way that the degree of variability of the search accuracy or the compression rate as attributed to product quantization gets closer to the target value. Hence, in addition to become able to improve the quantization efficiency of the feature vectors 210 in an identical manner to the first embodiment, parameter adjustment can be easily performed in accordance with the objective.

Third Example

Given below is the explanation of a third example. In the third example, the following function is added to the second example: when a new feature vector 210 is added to the feature vector set 200, it is determined whether or not the codebook 240 needs to be updated, and the codebook 240 is updated only when it is determined necessary to do so. The other functions are identical to the second example. Hence, the following explanation is given only for the function peculiar to the third example.

In the actual operations, sometimes there is a demand for adding, as needed, new feature vectors 210 to the feature vector set 200 to be held. In that regard, if the codebook 240 is updated in response to every instance of adding a new feature vector 210 to the feature vector set 200, a large amount of calculation period is required in updating the codebook 240, which is not an efficient way. In that regard, in the third example, when a new feature vector 210 is added to the feature vector set 200, it is determined whether or not the codebook 240 needs to be updated. If it is determined that the codebook 240 needs to be updated, only the necessary portion of the codebook 240 is updated.

The case in which the codebook 240 needs to be updated implies a case in which at least one of the dimension-variable sub-vectors 220 generated from the new feature vector 210 does not fit within a range of dispersion of the cluster corresponding to that dimension-variable sub-vector 220, that is, implies a case in which the addition of a new feature vector 210 results in the expansion of the range of dispersion of any one cluster of at least any one of the sub-vector groups 230. In the third example, in such a case, the cluster for which the range of dispersion gets expanded is treated as a target for updating, and a representative vector of that cluster is updated in the codebook 240.

Figure 12:
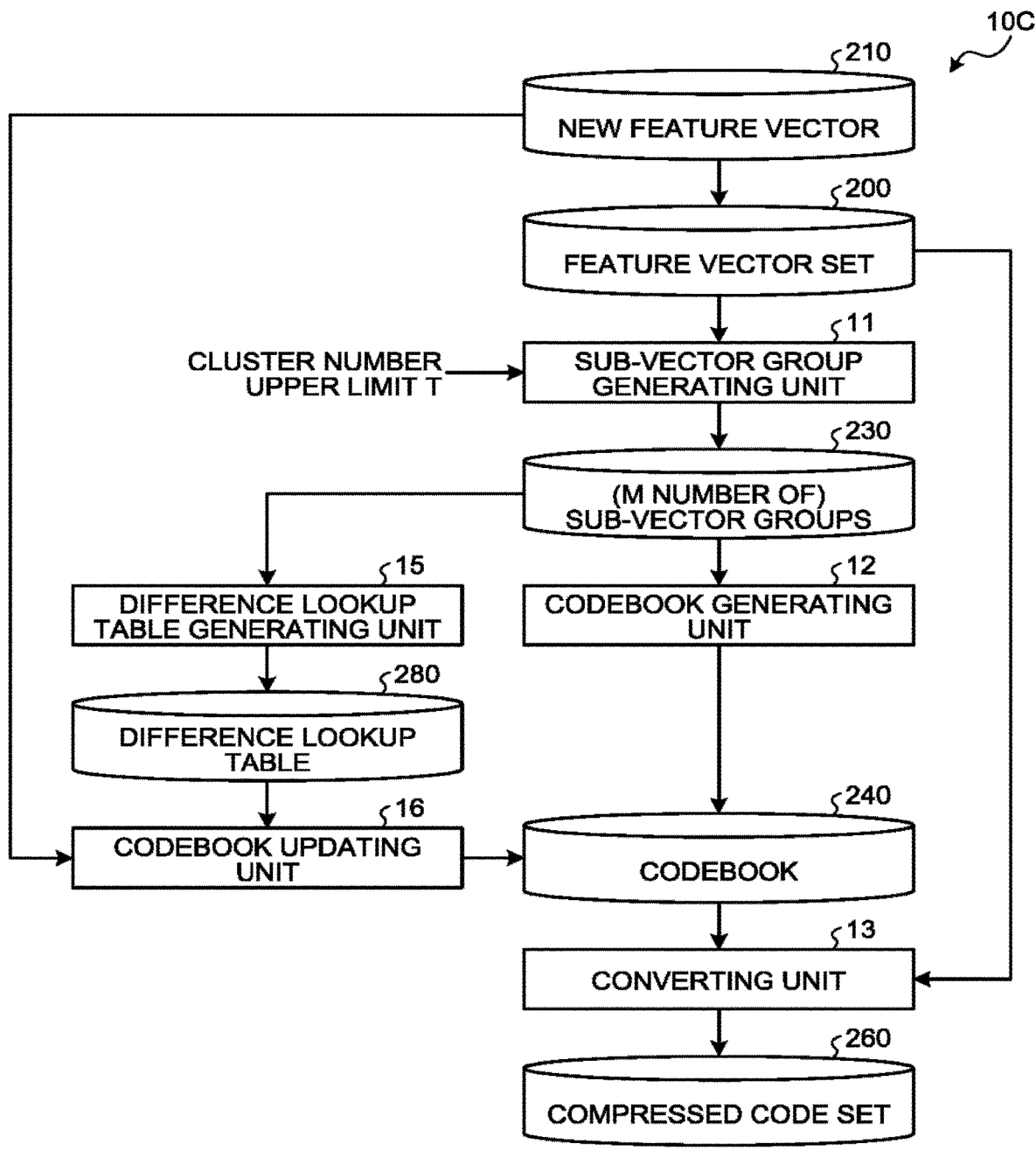
FIG. 12 is a block diagram illustrating an exemplary functional configuration of a data processing device according to a third example.

FIG. 12 is a block diagram illustrating an exemplary functional configuration of a data processing device 10C according to the third example. As illustrated in FIG. 12, the data processing device 10C according to the third example includes a difference lookup table generating unit 15 and a codebook updating unit 16 in addition to the configuration of the data processing device 10A according to the first example (see FIG. 6).

The difference lookup table generating unit 15 generates a difference lookup table 280 that is a lookup table in which, regarding each of the M number of sub-vector groups 230 generated from the original feature vector set 200, the value indicating the range of dispersion of the dimension-variable sub-vectors 220 in each cluster is associated with an index of that cluster. The range of dispersion of the dimension-variable sub-vectors 220 in a cluster can be expressed using the greatest value of distances between the representative vector of that cluster and the dimension-variable sub-vectors 220 belonging to that cluster. Thus, the difference lookup table 280 can be generated in which the greatest value of the distances between the representative vector of each cluster and the dimension-variable sub-vectors 220 belonging to that cluster is stored in a corresponding manner to the index of that cluster.

FIG. 13 is a diagram illustrating an example of the difference lookup table 280. As illustrated in FIG. 13, the difference lookup table 280 has an identical format to the codebook 240 as described above. However, the element value stored in a corresponding manner to the index of a cluster in each sub-vector group 230 is not the representative vector of that cluster but is the greatest value of the distances between the representative vector of that cluster and the dimension-variable sub-vectors 220 (i.e., the value indicating the range of dispersion of that cluster).

For example, the difference lookup table 280 can be generated along with the codebook 240 at the time of generating the codebook 240. That is, for each sub-vector group 230, the dimension-variable sub-vectors 220 are clustered and the representative vector of each cluster is obtained. Then, for each cluster, the distance between the representative vector of that cluster and each dimension-variable sub-vector 220 belonging to that cluster is obtained. Subsequently, the greatest value of the obtained distances is associated with the index of that cluster. In this way, the difference lookup table 280 as illustrated in FIG. 13 can be generated.

When a new feature vector 210 is added to the feature vector set 200, the codebook updating unit 16 generates N number of dimension-variable sub-vectors 220 from the new feature vector 210 according to the identical method to the method implemented in the first example. Then, regarding each of the N number of dimension-variable sub-vectors 220, from among the clusters of the sub-vector group 230 corresponding to that dimension-variable sub-vector 220 (i.e., from among the clusters of one of the M number of sub-vector groups 230 generated from the original feature vector set 200), the cluster having the closest representative vector to the concerned dimension-variable sub-vector 220 is obtained. Subsequently, the codebook updating unit 16 refers to the difference lookup table 280; compares the distances between the dimension-variable sub-vectors 220 generated from the new feature vectors 210 and the representative vector of the cluster with the element value stored in the difference lookup table 280 in a corresponding manner to the index of that cluster; and determines whether or not the dimension-variable sub-vectors 220 generated from the new feature vector 210 fit within the range of dispersion of the clusters. That is, if the distances between a dimension-variable sub-vector 220 generated from the new feature vector 210 and the representative vector of the cluster is equal to or smaller than the element value stored in the difference lookup table 280, then it is determined that the dimension-variable sub-vector 220 fits within the range of dispersion. However, if the distances between a dimension-variable sub-vector 220 generated from the new feature vector 210 and the representative vector of the cluster is greater than the element value stored in the difference lookup table 280, then it is determined that the dimension-variable sub-vector 220 does not fit within the range of dispersion.

The codebook updating unit 16 performs the abovementioned determination with respect to all dimension-variable sub-vectors 220 generated from the new feature vector 210 and, if all dimension-variable sub-vectors 220 fit within the range of dispersion of the corresponding clusters, determines that the codebook 240 need not be updated. On the other hand, when there are dimension-variable sub-vectors 220 that do not fit within the range of dispersion of the corresponding clusters, the codebook updating unit 16 determines that the codebook 240 needs to be updated. Then, the codebook updating unit 16 treats, as the target for updating, such a cluster for which the range of dispersion expands as a result of the addition of the dimension-variable sub-vectors 220 generated from the new feature vector 210, and performs X-means clustering with respect to the dimension-variable sub-vectors 220 belonging to the concerned cluster and including the dimension-variable sub-vectors 220 generated from the new feature vector 210. Subsequently, the codebook updating unit 16 updates the representative vector of the target cluster for updating in the codebook 240 using the value of the centroid of the cluster obtained as a result of performing X-means clustering.

When a plurality of centroids is obtained as a result of performing X-means clustering, the codebook updating unit 16 divides the target cluster for updating in the codebook 240 into a plurality of clusters. Then, for each cluster obtained by division, the codebook updating unit 16 associates the value of the centroid of that cluster, which serves as the representative vector, with the index. As a result, the number of indexes in the codebook 240 increases.

FIGS. 14A to 14D are diagrams for explaining a brief overview of the operations performed by the codebook updating unit 16, and are diagrams illustrating a situation in which the two-dimensional dimension-variable sub-vectors 220 having dimensions $X_1$ and $X_2$ are mapped in the sub-vector space. Herein, it is assumed that, as a result of performing clustering with respect to the sub-vector groups 230 generated from the original feature vector set 200, the dimension-variable sub-vectors 220 get clustered into two clusters, namely, a cluster C1 and a cluster C2 as illustrated in FIG. 14A.

Consider a case in which a new dimension-variable sub-vector 220 generated from a new feature vector 210 gets mapped in the feature vector space as illustrated in FIG. 14B. In the example illustrated in FIG. 14B, the new dimension-variable sub-vector 220 fits within a range R_C2 of dispersion of the cluster C2. Hence, regarding the two-dimensional dimension-variable sub-vectors 220 having the dimensions $X_1$ and $X_2$, the codebook updating unit 16 determines that the codebook 240 need not be updated in response to the addition of the new feature vector 210. Subsequently, regarding the dimension-variable sub-vectors 220 of other dimensions too, if it is also determined that the codebook 240 need not be updated, then the codebook updating unit 16 does not update the codebook 240 even if a new feature vector 210 gets added to the feature vector set 200.

Consider a case in which a plurality of feature vectors 210 is newly added, and the two-dimensional dimension-variable sub-vectors 220 that have the dimensions $X_1$ and $X_2$ and that are generated from each of the plurality of newly-added feature vectors 210 get mapped in the feature vector space as illustrated in FIG. 14C. Herein, it is assumed that each of a plurality of new dimension-variable sub-vectors 220 is closer to the representative vector of the cluster C2 than the representative vector of the cluster C1. In the example illustrated in FIG. 14C, some of the new dimension-variable sub-vectors 220 are positioned on the outside of the range R_C2 of dispersion of the cluster C2. Hence, the codebook updating unit 16 treats the cluster C2 as the target for updating. Then, the codebook updating unit 16 performs X-means clustering with respect to the original dimension-variable sub-vectors 220 belonging to the cluster C2 and the new dimension-variable sub-vectors 220 belonging to the cluster C2 and, and updates the representative vector of the cluster C2 in the codebook 240 with the centroids obtained as a result of performing X-means clustering.

At that time, if two centroids are obtained as a result of performing X-means clustering as illustrated in FIG. 14D, that is, if the cluster C2 is to be divided into two clusters C2a and C2b as a result of performing X-means clustering; then the codebook updating unit 16 divides the cluster C2 into the clusters C2a and C2b and individually associates the respective centroids as the respective representative vectors with indexes. As a result of such operations, it becomes possible to efficiently update the codebook 240 in response to the addition of a new feature vector 210 to the feature vector set 200.

As described above, in the third example, when a new feature vector 210 is added to the feature vector set 200, it is determined whether or not the codebook 240 needs to be updated and, only when the updating is determined to be necessary, the codebook 240 is updated. Hence, in addition to becomes able to improve the quantization efficiency of the feature vectors 210 in an identical manner to the first example, it becomes possible to efficiently update the codebook 240 in response to the addition of a new feature vector 210.

Supplementary Explanation

The data processing devices 10A, 10B, and 10C according to the working examples described above (hereinafter, collectively referred to as "data processing device 10") can be implemented, for example, using a computer program running in the execution environment of hardware represented by a general-purpose computer. In that case, the functional constituent elements of the data processing device (i.e., the sub-vector group generating unit 11, the codebook generating unit 12, the converting unit 13, the parameter adjusting unit 14, the difference lookup table generating unit 15, and the codebook updating unit 16) are implemented according to the cooperation between hardware and software (the computer program).

Figure 15:
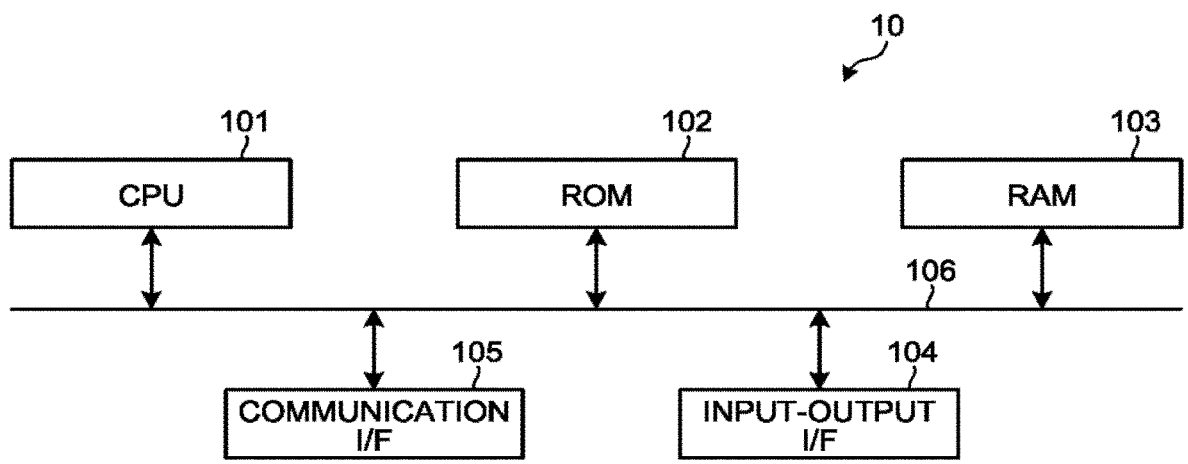
FIG. 15 is a block diagram illustrating an exemplary hardware configuration of the data processing device.

FIG. 15 is a block diagram illustrating an exemplary hardware configuration of the data processing device 10. For example, as illustrated in FIG. 15, the data processing device 10 can have the hardware configuration of a general-purpose computer that includes a processor circuit such as a central processing unit (CPU) 101; memory devices such as a read only memory (ROM) 102 and a random access memory (RAM) 103; an input-output interface (I/F) 104 to which a display panel and various operation devices are connected; a communication I/F 105 that establishes connection with a network and performs communication; and a bus 106 that connects the constituent elements to each other.

The computer program executed in the hardware having the abovementioned configuration is recorded as, for example, an installable file or an executable file in a computer-readable recording medium such as a compact disk read only memory (CD-ROM), a flexible disk (FD), a compact disk recordable (CD-R), or a digital versatile disc (DVD); and is provided as a computer program product. Alternatively, the computer program executed in the hardware having the abovementioned configuration can be stored in a downloadable manner in a computer connected to a network such as the Internet. Still alternatively, the computer program executed in the hardware having the abovementioned configuration can be distributed via a network such as the Internet. Still alternatively, the computer program executed in the hardware having the abovementioned configuration can be stored in advance in the ROM 102.

The computer program executed in the hardware having the abovementioned configuration contains modules for the functional constituent elements of the data processing device 10. For example, the CPU 101 (the processor circuit) reads the computer program from the recording medium and executes it, so that the constituent elements are loaded and generated in the RAM 103 (a main memory). Meanwhile, the functional constituent elements of the data processing device 10 can be implemented among a plurality of computers. Alternatively, some or all of the functional constituent elements can be implemented using dedicated hardware such as an application specific integrated circuit (ASIC) or a field-programmable gate array (FPGA).

According to at least one of the embodiments described above, feature vectors can be quantized in an efficient manner.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data processing device comprising:
   a sub-vector group generating unit that, from a feature vector set including N number of D-dimensional feature vectors, generates M number of sub-vector groups (where M<D holds true), each of the M number of sub-vector groups including N number of dimension-variable sub-vectors obtained from the N number of D-dimensional feature vectors, each of the N number of dimension-variable sub-vectors having, as elements, values of one or more dimensions extracted from the D-dimensional feature vectors, and a number of elements in the dimension-variable sub-vectors in at least one sub-vector group from among the M number of sub-vector groups being different from a number of elements of the dimension-variable sub-vectors in other sub-vector groups;
   wherein the sub-vector group generating unit generates the M number of sub-vector groups in such a way that a degree of dispersion of the dimension-variable sub-vectors is similar among the M number of sub-vector groups;
   a codebook generating unit that, for each of the M number of sub-vector groups, performs clustering of the N number of dimension-variable sub-vectors, and generates a codebook in which a representative vector of each cluster is associated with an index; and
   a converting unit that performs product quantization using the codebook and converts each of the N number of D-dimensional feature vectors into a compressed code made of combination of M number of indexes.

2. The data processing device according to claim 1, wherein, for each of the M number of sub-vector groups, the codebook generating unit performs clustering of the N number of dimension-variable sub-vectors based on an estimated optimum cluster number of sub-vector groups, and generates the codebook in which cluster number corresponding to at least one sub-vector group from among the M number of sub-vector groups is different than cluster number corresponding to other sub-vector groups.

3. The data processing device according to claim 1, wherein the sub-vector group generating unit obtains optimum cluster number C regarding each dimension of the N number of D-dimensional feature vectors, makes groups of dimensions having a same optimum cluster number C,
   regarding a group in which an optimum cluster number of sub-vector groups expressed as GC (where G represents a number of dimensions belonging to a group) is greater than a cluster number upper limit T, divides the group until GC≤T or G=1 holds true, and
   generates the M number of sub-vector groups from the feature vector set.

4. The data processing device according to claim 3, further comprising a parameter adjusting unit that exploratorily decides on the cluster number upper limit T in such a way that either a degree of variability of search accuracy before and after the conversion of each of the N number of D-dimensional feature vectors into the compression code or a compression rate attributed to the conversion of each of the N number of D-dimensional feature vectors into the compression code gets closer to a target value that has been set.

5. The data processing device according to claim 1, further comprising:
   a difference lookup table generating unit that, regarding each of the M number of sub-vector groups, generates a difference lookup table in which a value indicating range of dispersion of the dimension-variable sub-vectors in each of the clusters is associated with the index; and
   a codebook updating unit that
      when a new feature vector is added to the feature vector set, obtains a cluster of each dimension-variable sub-vector generated from the new feature vector,
      refers to the difference lookup table,
      determines whether or not all dimension-variable sub-vectors fit within the range of dispersion of corresponding clusters, and
      if there is a dimension-variable sub-vector that does not fit within the range of dispersion of the corresponding clusters, updates the representative vector of the concerned cluster in the codebook.

6. The data processing device according to claim 5, wherein the codebook updating unit divides a target cluster for updating into a plurality of clusters, and associates a representative vector of each post-division cluster with an index.

7. A data processing method comprising:
   generating, from a feature vector set including N number of D-dimensional feature vectors, M number of sub-vector groups (where M<D holds true), each of the M number of sub vector groups including N number of dimension-variable sub-vectors obtained from the N number of D-dimensional feature vectors, each of the N number of dimension-variable sub-vectors having, as elements, values of one or more dimensions extracted from the D-dimensional feature vectors, and a number of elements in the dimension-variable sub-vectors in at least one sub-vector group from among the M number of sub-vector groups being different from a number of elements of the dimension-variable sub-vectors in other sub-vector groups;
   wherein the sub-vector group generating unit generates the M number of sub-vector groups in such a way that a degree of dispersion of the dimension-variable sub-vectors is similar among the M number of sub-vector groups;

performing clustering of the N number of dimension-variable sub-vectors for each of the M number of sub-vector groups, and generating a codebook in which representative vector of each cluster is associated with an index; and performing product quantization using the codebook and converting each of the N number of D-dimensional feature vectors into a compressed code made of combination of M number of indexes.

8. A computer program product having a non-transitory computer readable medium including programmed instructions, wherein the instructions, when executed by a computer, cause the computer to perform:

generating, from a feature vector set including N number of D-dimensional feature vectors, M number of sub-vector groups (where M<D holds true), each of the M number of sub-vector groups including N number of dimension-variable sub-vectors obtained from the N number of D-dimensional feature vectors, each of the N number of dimension-variable sub-vectors having, as elements, values of one or more dimensions extracted from the D-dimensional feature vectors, and a number of elements in the dimension-variable sub-vectors in at least one sub-vector group from among the M number of sub-vector groups being different from a number of elements of the dimension-variable sub-vectors in other sub-vector groups;

wherein the sub-vector group generating unit generates the M number of sub-vector groups in such a way that a degree of dispersion of the dimension-variable sub-vectors is similar among the M number of sub-vector groups;

performing clustering of the N number of dimension-variable sub-vectors for each of the M number of sub-vector groups, and generating a codebook in which a representative vector of each cluster is associated with an index; and performing product quantization using the codebook and converting each of the N number of D-dimensional feature vectors into a compressed code made of combination of M number of indexes.

* * * * *